(12) United States Patent
Nekado (10) Patent No.: US 6,580,264 B2
(45) Date of Patent: Jun. 17, 2003

(54) POSITION DETECTOR WITH MAGNETIC CORE AND DETECTION AND AUXILIARY COILS

(75) Inventor: Yasuo Nekado, Kanagawa (JP)

(73) Assignee: Sony Precision Technology Inc., Tokyo (JP)

( * ) Notice: Subject to any disclaimer, the term of this patent is extended or adjusted under 35 U.S.C. 154(b) by 0 days.

(21) Appl. No.: 09/816,859

(22) Filed: Mar. 23, 2001

(65) Prior Publication Data

US 2001/0028248 A1 Oct. 11, 2001

(30) Foreign Application Priority Data

Mar. 27, 2000 (JP) .......................................... 2000-090742

(51) Int. Cl.⁷ ................................................. G01B 7/14
(52) U.S. Cl. .............................. 324/207.16; 324/207.24; 324/207.12; 336/136
(58) Field of Search ..................... 324/207.12, 207.16, 324/207.17, 207.18, 207.19, 207.24, 207.25, 234, 236; 336/136

(56) References Cited

U.S. PATENT DOCUMENTS

| 3,234,491 | A | * | 2/1966 | Baur | .......................... | 336/136 |
| 4,623,840 | A | | 11/1986 | Fujimura et al. | ....... | 324/207.16 |
| 4,723,446 | A | * | 2/1988 | Saito et al. | ............. | 324/207.17 |
| 6,310,472 | B1 | * | 10/2001 | Chass | .................... | 324/207.17 |

FOREIGN PATENT DOCUMENTS

DE 3518772 11/1986

\* cited by examiner

*Primary Examiner*—Jay Patidar
(74) *Attorney, Agent, or Firm*—Jay H. Maioli (57) ABSTRACT

In a position transducer having detection coils 11 and 21, auxiliary coils 12 and 22 are driven in phase with the detection coils 11 and 21 and are lap-wound on the ends of the detection coils to substantially increase the winding density at the ends of the detection coils 11 and 21, thereby reducing the magnetic field non-linearity at the coil ends.

3 Claims, 7 Drawing Sheets

POSITION DETECTOR WITH MAGNETIC CORE AND DETECTION AND AUXILIARY COILS

BACKGROUND OF THE INVENTION

1. Field of the Invention

The present invention relates to a position transducer which detects an amount of travel and moved position of a moving or movable part of machine tools, industrial robots, etc.

2. Description of the Related Art

Figure 1:
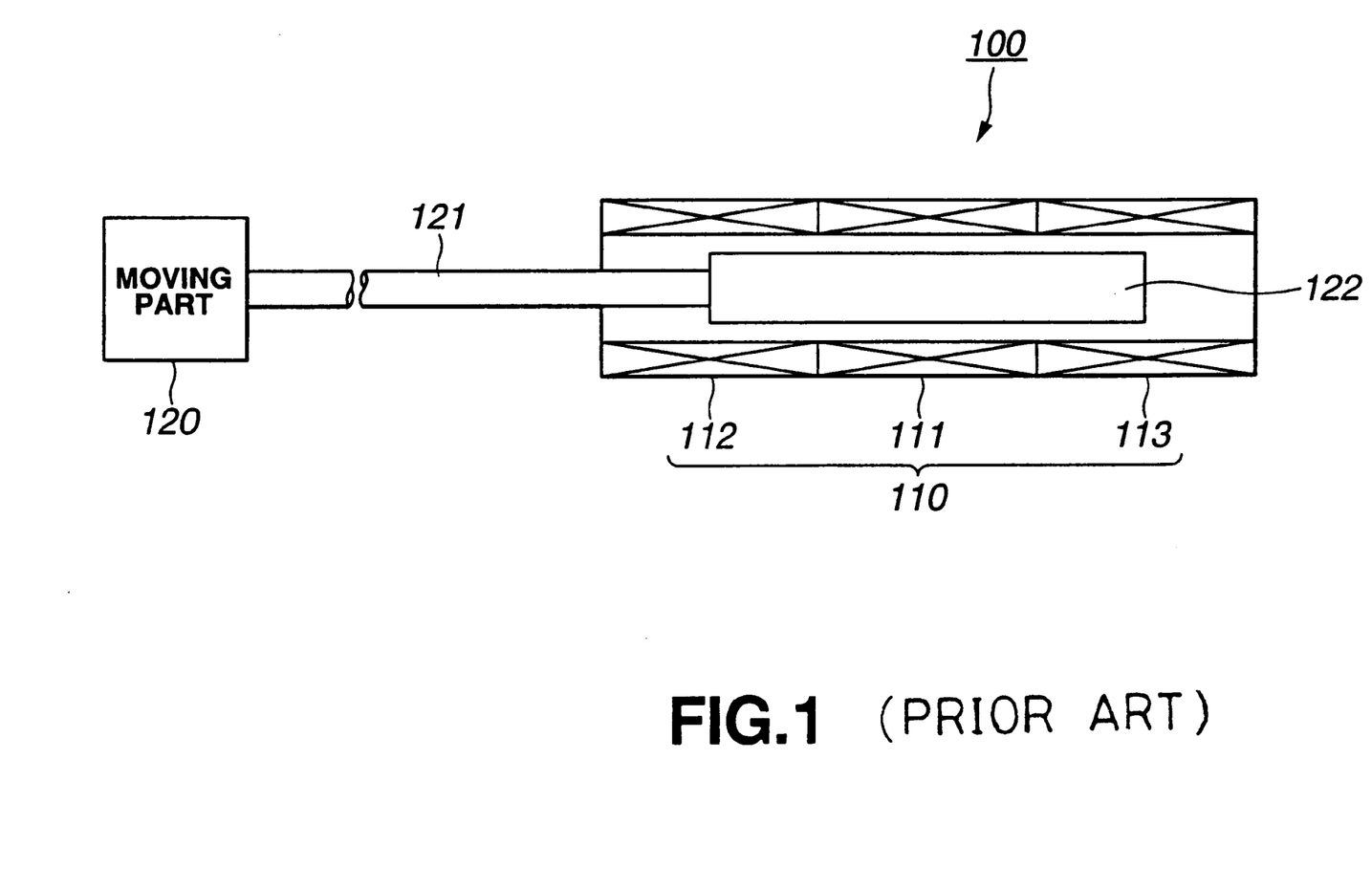
FIG. 1 schematically illustrates the conventional differential transformer type position transducer.

As a position transducer which detects an amount of travel and moved position of a moving part of machines tool, industrial robots, etc., there has been proposed a position transducer 100 of a differential transformer type as shown in FIG. 1.

As shown in FIG. 1, the differential transformer type position transducer 100 includes a detection unit 110 consisting of an exciting coil 111 excited with a signal of 2 to 3 kHz in frequency for example, a first detection coil 112 disposed adjacently to one end of the exciting coil 111 and concentrically with the exciting coil 111, and a second detection coil 113 disposed adjacently to the other end of the exciting coil 111 and concentrically with the exciting coil 111, and a round bar-shaped magnetic core 122 installed with a spindle 121 to a moving part 120 of a machine tool, industrial robot or the like movably inside the detection unit 110 along the center axis of the latter as the moving part 120 moves.

The first and second detection coils 112 and 113 are longer than the moving distance of the core 122, and the exciting coil 111 is substantially as long as the first and second detection coils 112 and 113. The first and second detection coils 112 and 113 are magnetically coupled to the exciting coil 111 and given magnetic fluxes by the exciting coil 111 to induce an electric power.

In the position transducer 100 constructed as in the above, when the penetration or amount of insertion of the core 122 in the first and second detection coils 112 and 113 changes as the core 122 moves inside the detector 110, the inductance of the first and second detection coils 112 and 113 will be changed correspondingly to the amount of insertion of the core 122. Thus, the electric power from the first and second detection coils 112 and 113, induced due to the magnetic fluxes from the exciting coil 111, will change correspondingly to an amount of travel of the core 122.

Therefore, by determining a difference in output between the first and second detection coils 112 and 113, the differential transformer the position transducer 100 can detect, with a high accuracy, an amount of travel and moved position of the core 122, that is, of a moving part 120 to which the core 122 is fixed.

Figure 2:
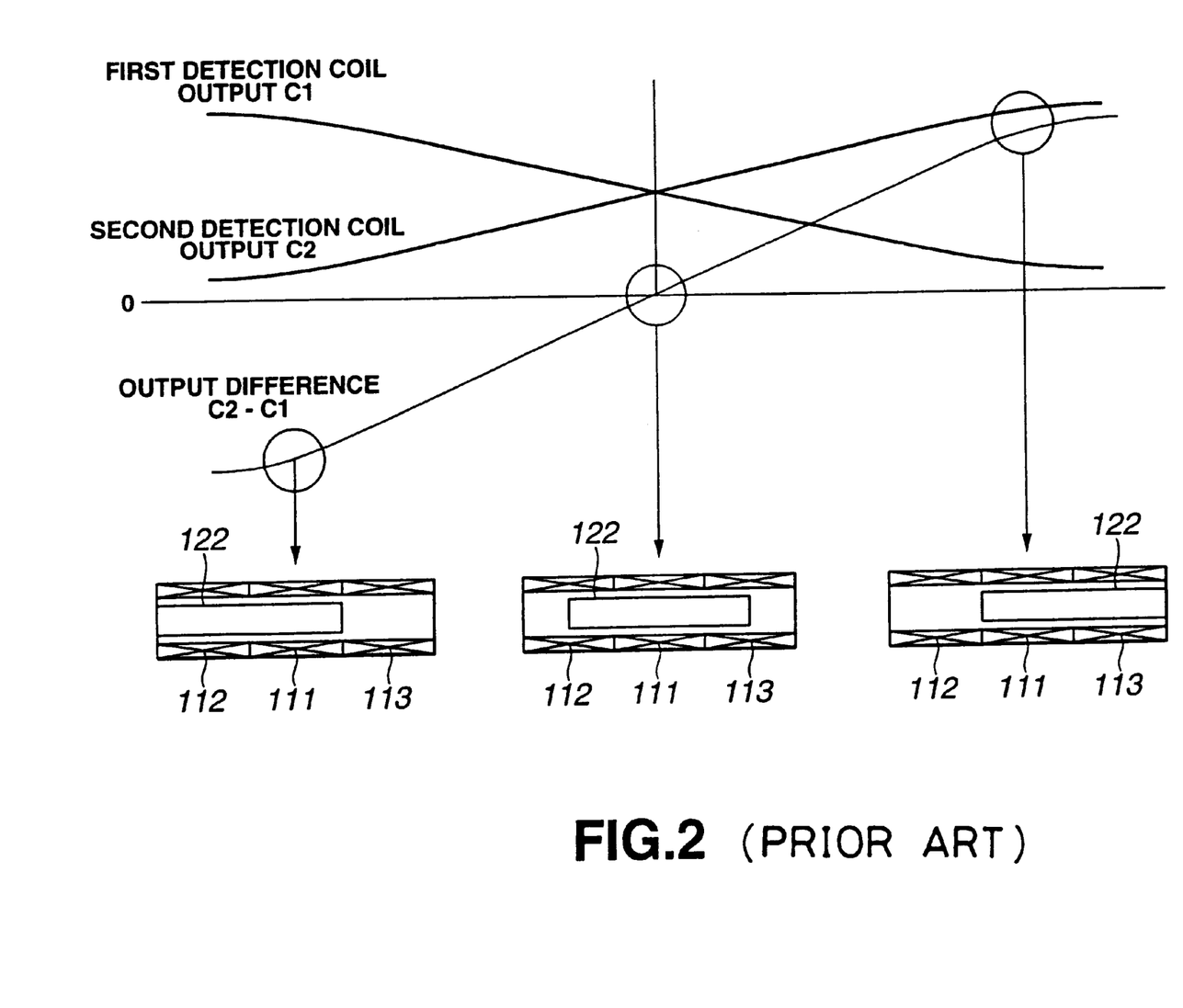
FIG. 2 also schematically illustrates the output characteristic of the differential transformer type position transducer in FIG. 1.

FIG. 2 shows an output characteristic of the above differential transformer type position transducer 100. On the assumption that a position where the penetration of the core 122 in the first detection coil 112 and that of the penetration of the core 122 in the second detection coil 113 are equal to each other is a reference position, when the core 122 is at the reference position, the inductance of the first detection coil 112 is equal to that of the second detection coil 113. Thus, an output C1 from the first detection coil 112 is equal to an output C2 from the second detection coil 113 and the difference between these outputs (C2-C1) is zero.

As the core 122 moves from the reference position, the amount of insertion of the core 122 in one of the detection coils increases while that of the core 122 in the other decreases. Thus the detection coil in which the amount of insertion of the core 122 is increased will have the inductance thereof linearly increased for the increased amount of insertion or amount of travel of the core 122, while the detection coil in which the amount of insertion of the core 122 is decreased will have the inductance thereof linearly decreased for the decreased amount of insertion or amount of travel of the core 122. Therefore, by converting the change in inductance of each detection coil to determine a difference in output (C2-C1) between the detection coils, it is possible to detect, with a high accuracy, the amount of travel and moved position of the core 122, that is, of the moving part 120 to which the core 122 is fixed, while canceling the influence of electric noises.

There has also been proposed an MI effect type position transducer having a so-called magnetic impedance effect (will be referred to as "MI effect" hereunder) applied therein, as a position transducer similar to the aforementioned differential transformer type position transducer 100.

The MI effect type position transducer is not illustrated herein. It includes a pair of detection coils corresponding to the first and second detection coils 112 and 113, respectively, in the aforementioned differential transformer type position transducer 100 and which is excited directly. Because of this direct excitation, this position transducer has not any coil corresponding to the exciting coil 111 in the differential transformer type position transducer 100.

In the MI effect type position transducer, when the pair of detection coils is driven with a high frequency pulse whose rate is a few MHz to tens MHz and width is a few ns to tens ns, or a sinusoidal wave having a similar pulse rate, the inductance component of the detection coils and the skin effect of a magnetic substance, developed by a high frequency excitation, will cause the actual resistance component of the detection coils to change correspondingly to a relative position of the core to the pair of detection coils. Therefore, by adapting the MI effect type position transducer to detect changes in impedance of the detection coils, which is a combination of the changes in inductance component and actual resistance component of the detection coils, it is possible to have a very wide output dynamic range and detect, with a higher accuracy, the amount of travel and moving distance of the core, namely, a moving pat to which the core is fixed.

Disadvantageously, however, the aforementioned conventional different transformer type and MI effect type position transducers as a whole can hardly be designed compact. More specifically, the conventional differential transformer type position transducer needs three coils longer than the moving distance of the core and the whole apparatus has to be more than three times longer than the moving distance (effective length for detection) of the core.

In the conventional MI effect type position transducer, there is not provided any coil corresponding to the exciting coil used in the differential transformer type position transducer. Since the magnetic field at the ends of the detection coils is less uniform and so the output linearity is lower, the length of the apparatus in the moving direction of the core has to be sufficiently longer than the effective length for detection in order to assure a high accuracy of detection. Thus, the conventional MI effect type position transducer as a whole cannot be designed so much compact as compared with the differential transformer type position transducer.

To provide a solution to the above problems of the prior art, the Inventor of the present invention has proposed a position transducer disclosed in the Japanese Published Unexamined Application No. 2000-9412. The position transducer includes first and second detection coils excited with a high frequency, and a core fixed with a spindle to a moving part of a machine tool, industrial robot or the like and moved inside the first detection coil. When the core is in place (at a reference or home position) inside the first detection coil, the impedance of the first detection coil is equal to that of the second detection coil. In this position transducer, when the core moves from the reference position, the impedance of the first detection coil changes linearly correspondingly to the amount of travel of the core while the impedance of the second detection coil is always set constant independently of the amount of travel of the core. Therefore, with this position transducer, by converting a change in impedance of the first detection coil and determining a difference in output between the first and second detection coils, it is possible to detect, with a high accuracy, the amount of travel of the core, that is, the amount of travel and moved position of the moving part fixed to the core while canceling the influence of electric noises.

In this position transducer, the first detection coil has to be longer than the amount of travel of the core (effective length for detection) while the second detection coil can be reduced in length. Therefore, the position transducer can be designed more compact on the whole.

Similarly to the aforementioned MI effect type position transducer, this position transducer shows a reduced uniformity of the magnetic field at the end of the first detection coil. To solve this problem, a magnetic material such as Permalloy having a high permeability is disposed near the end of the first detection coil to make ideally parallel the magnetic fluxes at the end of the first excitation coil, thereby reducing the magnetic field non-linearity at the end of the first detection coil.

As in the above, in the position transducer disclosed in the Japanese Published Unexamined Application No. 2000-9412, since the length of one of the pair of the detection coils is short, and the magnetic material having a high permeability is disposed near the end of the detection coil having a change in impedance to improve the magnetic field non-linearity at the end of the detection coil, the position transducer can be designed more compact on the whole by making the length of the coil of the direction in which the core moves shorter than the effective length for detection.

In the position transducer disclosed in the Japanese Published Unexamined Application No. 2000-9412, the whole apparatus is designed compact and can detect a position with a high accuracy. However, since the magnetic material having a high permeability such as Permalloy is disposed near the end of the first detection coil to reduce the magnetic field non-linearity at the end of the first detection coil, the manufacturing cost is increased and apparatus construction is complicated. Also, since the position transducer has to be assembled with a relatively high precision, the manufacturing cost is further increased.

OBJECT AND SUMMARY OF THE INVENTION

It is therefore an object of the present invention to overcome the above-mentioned drawbacks of the prior art by providing a position transducer which assures an effective length for detection effectively with a simple construction, is designed compact on the whole with no increase of the manufacturing cost and can detect a position with a high accuracy.

The above object can be attained by providing a position transducer including a detection coil excited with a high frequency, a magnetic core inserted in the detection coil movably in relation to the latter and along the center axis of the latter, an auxiliary coil lap-wound on an end of the detection coil and driven in phase with the detection coil, and means for detecting a relative position of the core to the detection coil on the basis of an impedance change of the detection coil.

In the above position transducer, as the core is moved inside the detection coils excited with a high frequency in relation to the latter, the changes in impedance of the detection coils vary correspondingly to the amount of travel of the core. Based on the change in impedance of the detection coils, the position detecting means will detect a relative position of the core to the detection coils. Therefore, by fixing the core of the position transducer or one of the detection coils to a moving part of a machine tool, industrial robot or the like, it is possible to detect an amount of travel and moved position of the moving part.

In the above position transducer, the auxiliary coil lap-wound on the detection coil at an end of the latter and driven in phase with the detection coil reduces the magnetic field non-linearity at the end of the detection coil, whereby the position transducer can assure an effective length for detection effectively and be designed compact on the whole.

In the position transducer according to the present invention, the detection coil may include first and second detection coils disposed concentrically with and adjacent to each other, and the position detecting means may detect a relative position of the core to the detection coils is detected by determining a difference in output between the first and second detection coils.

Thus, by detecting the relative position of the core to the detection coils on the basis of the difference in output between the first and second detection coils, it is possible to cancel the influence of electric noises etc. and thus detect, with a higher accuracy, the relative position of the core to the detection coils.

Also the position transducer according to the present invention may be designed such that when the core is at a reference position inside the detection coil, the impedance of the auxiliary coil is equal to that of the detection coil and the position detecting means determines a difference in output between the detection coil and auxiliary coil to detect a relative position of the core to the detection coil.

Thus, by detecting the relative position of the core to the detection coils on the basis of the difference in output between the first and second detection coils, it is possible to cancel the influence of electric noises etc. and thus detect, with a higher accuracy, the relative position of the core to the detection coils.

Also in the position transducer according to the present invention, the auxiliary coil may include a first auxiliary coil provided at one end of the detection coil and a second auxiliary coil connected in series to the first auxiliary coil and provided at the other end of the detection coil, and when the core is at a reference position inside the detection coil, the total impedance of the first and second auxiliary coils is equal to the impedance of the detection coil and the position detecting means determines a difference in output between the detection coil and first and second auxiliary coils to detect a relative position of the core to the detection coil.

Thus, by providing the fist auxiliary coil at one end of the detection coil and the second auxiliary coil at the other end of the detection coil, it is possible to improve the magnetic field uniformity at the opposite ends of the detection coil and thus assure an effective length for detection effectively.

In the position transducer according to the present invention, there are lap-wound on the end portions of the detection coil auxiliary the auxiliary coils which are driven in phase with the detection coil to substantially increase the winding density at the end portions of the detection coil, thereby reducing the non-linearity of the magnetic field at the ends of the detection coil. Therefore, with this position transducer, the effective length for detection can be assured efficiently, and the length of the detection coil in relation to the effective length for detection is relatively decreased to design the position transducer compact on the whole and permit a high accuracy of the position detection.

Also, with the position transducer, the effective length for detection can be assured efficiently with simple measures such as a lap-winding of auxiliary coils on the end portions of the detection coil, so the position transducer can be designed compact on the whole without increase of the manufacturing costs.

These objects and other objects, features and advantages of the present intention will become more apparent from the following detailed description of the preferred embodiments of the present invention when taken in conjunction with the accompanying drawings.

DETAILED DESCRIPTION OF THE PREFERRED EMBODIMENTS

First Embodiment

Figure 3:
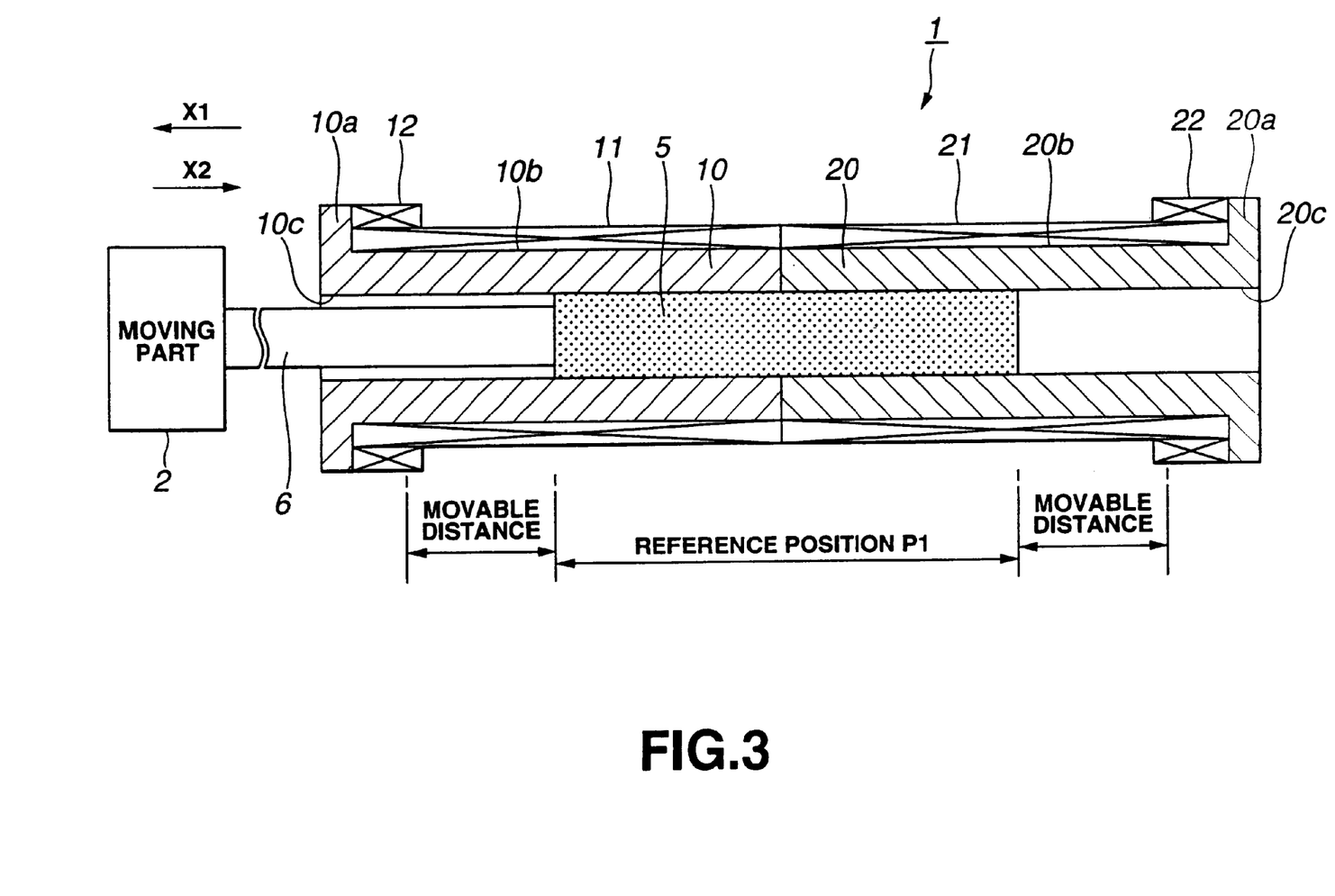
FIG. 3 is a sectional view of an embodiment of the position transducer according to the present invention.

Referring now to FIG. 3, there is illustrated in the form of a sectional view the first embodiment of the position transducer according to the present invention. As in FIG. 3, the position transducer is generally indicated with a reference 1. The position transducer 1 is adapted to detect an amount of travel and moved position of a moving part 2 of a machine tool, industrial robot or the like. The moving part 2 moves linearly. It should be noted that the present invention will be described herebelow concerning the position transducer 1 whose effective length for detection is set to 8 mm or more so that an amount of travel and moved position of the moving part 2 moving linearly within a range of 8 mm at the maximum in the directions of arrows X1 and X2.

As shown, the position transducer 1 includes a first coil bobbin 10 having a first detection coil 11 wound thereon and on a second coil bobbin 20 having a second detection coil 21 wound thereon.

The first and second coil bobbins 10 and 20 are formed cylindrical, and have flanges 10a and 20a formed at one end thereof, respectively. In these first and second Coil bobbins 10 and 20, the first and second detection coils 11 and 21 are wound on winding areas 10b and 20b, respectively, extending from inner surfaces of the flanges 10a and 20a to inner ends of the first and second coil bobbins 10 and 20, respectively. The outside diameter of the bobbins 10 and 20 as measured at the winding areas 10b and 20b is about 3 mm for example. The winding areas 10b and 20b are about 10 mm for example. The first detection coil 11 is wound on the winding area 10b of the first coil bobbin 10, and the second detection coil 21 is wound on the winding area 20b of the second coil bobbin 20.

The first detection coil 11 is formed from a Cu wire of about 70 $\mu$m in diameter (including the coating thereof) for example, wound to form a single layer over the winding area 10b of the first coil bobbin 10. More particularly, the first detection coil 11 is formed from 140 turns, for example, of the Cu wires on the winding area 10b of the first coil bobbin 10. Similarly, the second detection coil 21 is formed from 140 turns, for example, of the Cu wire of about 70 $\mu$m in diameter over the winding area 20b of the second coil bobbin 20.

A first auxiliary coil 12 is further lap-wound on a portion, near the flange 10a of the first detection coil 11, for example, over an inner area of about 1.5 mm from the flange 10a at one end of the first coil bobbin 10. The first auxiliary coil 12 is intended to increase the winding density at the one end portion of the first detection coil 11, to thereby compensate the output of the first detection coil 11. The first auxiliary coil 12 is formed from 20 turns, for example, of the similar Cu wire to that of the first detection coil 11, made on the one end portion of the first detection coil 11, and has one end thereof connected to one end of the first detection coil 11. The first auxiliary coil 12 and first detection coil 11 are electrically connected in series to each other so that they are driven in phase with each other and thus a magnetic field be developed by the first auxiliary coil 12 in the same direction as a magnetic field developed by the first detection coil 11 when they are driven.

Similarly, a second auxiliary coil 22 is further lap-wound on the second detection coil 21 over an inner area of about 1.5 mm from the flange 20a at one end of the second coil bobbin 20. The first auxiliary coil 22 is intended to increase the winding density at the one end portion of the second detection coil 21, to thereby compensate the output of the second detection coil 21. The second auxiliary coil 22 is formed from 20 turns, for example, of the similar Cu wire to that of the second detection coil 21, made on the one end portion of the second detection coil 21, and has one end thereof connected to one end of the second detection coil 21. The second auxiliary coil 22 and second detection coil 21 are electrically connected in series to each other so that they are driven in phase with each other and thus a magnetic field be developed by the second auxiliary coil 22 in the same direction as a magnetic field developed by the second detection coil 21 when they are driven.

The first coil bobbin 10 on which the first detection coil 11 and first auxiliary coil 12 are wound and the second coil bobbin 20 on which the second detection coil 21 and second auxiliary coil 22 are wound, are disposed to abut each other, at their respective inner ends where the flanges 10a and 20a are not formed, concentrically with each other, that is, in such a manner that the center axis of the first detection coil 11 and first auxiliary coil 12 is aligned with that of the second detection coil 21 and second auxiliary coil 22.

The other end of the first detection coil 11, not connected to the first auxiliary coil 12, is connected to the other end of the second detection coil 21, not connected to the second auxiliary coil 22, while the common connection of the first and second detection coils 11 and 21 is connected to a drive/detection circuit which will further be described later by a first signal line (not shown). The other end of the first auxiliary coil 12, not connected to the first detection coil 11, is connected to the drive/detection circuit by a second signal line (not shown), while the other end of the second auxiliary coil 22, not connected to the second detection coil 21, is connected to the drive/detection circuit by a third signal line (not shown). The first detection coil 11 and first auxiliary coil 12, and the second detection coil 21 and second auxiliary coil 22, are driven with a high frequency by the drive/detection circuit, respectively.

The first and second coil bobbins 10 and 20 have center holes 10c and 20c, respectively, formed center-axially thereof. Each of the center holes 10c and 20c in the first and second coil bobbins 10 and 20, respectively, has a diameter of about 2.2 mm. When the first and second coil bobbins 10 and 20 are disposed to abut each other, the center holes 10c and 20c will form together a continuous core insertion hole. In the position transducer 1, a magnetic, round bar-shaped core 5 is inserted in the core insertion bole to be movable linearly inside the core insertion hole.

The core 5 is formed from a round bar as mentioned above. More specifically, the core 5 is a round bar of a magnetic material such as SK material (carbon steel) or the like having a diameter of about 2 mm and length of about 10 mm. The core 5 is coupled at one end thereof to the linearly moving part 2 of a machine tool, industrial robot or the like by a spindle 6. The core 5 is inserted into the core insertion hole formed from the combination of the center hole 10c in the first coil bobbin 10 and center hole 20c in the second coil bobbin 20 in such a manner that as the moving part 2 is moved linearly, the core 5 will move linearly inside the core insertion hole along the center axis of the first and second detection coils 11 and 21 in relation to a reference position P1 where the core 5 is positioned evenly in both the first detection coil 11 wound on the first coil bobbin 10 and the second detection coil 21 wound on the second coil bobbin 20.

Note that the core 5 may be made of any material which is a magnetic one. For example, Permalloy or an amorphous alloy may be used to form the core 5. However, since the core 5 made of even an SK material inexpensively available can provide a sufficient output, the core should desirably be formed from an SK material in view of the manufacturing costs. Also, to prevent rusting of the core 5 for a longer service life of the position transducer 1, it will be an effective measure to plate the core 5 with Cr, Zn, Ni or the like. Such a plating of the core 5 will little influence the characteristic of the core 5.

In the aforementioned position transducer 1, when the moving part 2 which is a linearly moving part of a machine tool, industrial robot or the like is moved linearly in the directions of arrows X1 and X2 in FIG. 3, the core 5 coupled to the moving part 2 will be moved linearly inside the core insertion hole for the amount of travel of the moving part 2. As the core 5 moves linearly inside the core insertion hole, the amount of insertion of the core 5 in the first and second detection coils 11 and 21 will be changed and thus the impedances of the first and second detection coils 11 and 21 will correspondingly be changed.

Namely, the impedance of the first detection coil 11 and that of the second detection coil 21 depend upon the amount of insertion of the core 5 in the first and second detection coils 11 and 21, and will be changed linearly in proportion to a change in amount of insertion of the core 5. For example, when the core 5 moves in the direction of arrow X1 from the reference position P1 at which the core 5 is inserted evenly in the first and second detection coils 11 and 21 and thus the amount of insertion of the core 5 increases in the first detection coil 11 while that of the core 5 in the second detection coil 21 decreases, the impedance of the first detection coil 11 will increase for the increase in amount of insertion of the core 5 while that of the second detection coil 21 will decrease for the decrease in amount of insertion of the core 5. On the other hand, when the core 5 moves in the direction of arrow X2 from the reference position P1 and thus the amount of insertion of the core 5 in the first detection coil 11 decreases while that of the core 5 in the second detection coil 12 increases, the impedance of the first detection coil 11 will decrease for the decrease in amount of insertion of the core 5 in the first detection coil 11 while that of the second detection coil 21 will increase for the increase in amount of insertion of the core 5 in the second detection coil 21.

Therefore, with this position transducer 1, it is possible to detect an amount of travel and moved position of the moving part 2 coupled to the core 5 with a high accuracy by converting the impedance changes of the first and second detection coils 11 and 21 to voltage changes and detecting the voltage changes. Also with this position transducer 1, since the impedance of the first detection coil 11 and that of the second detection coil 21 is changed differentially as the core 5 moves, an amount of travel and moved position of the moving part 2 can be detected with a high accuracy while canceling the influence of electric noises etc. by detecting a difference in output between the first and second detection coils 11 and 21.

Figure 4:
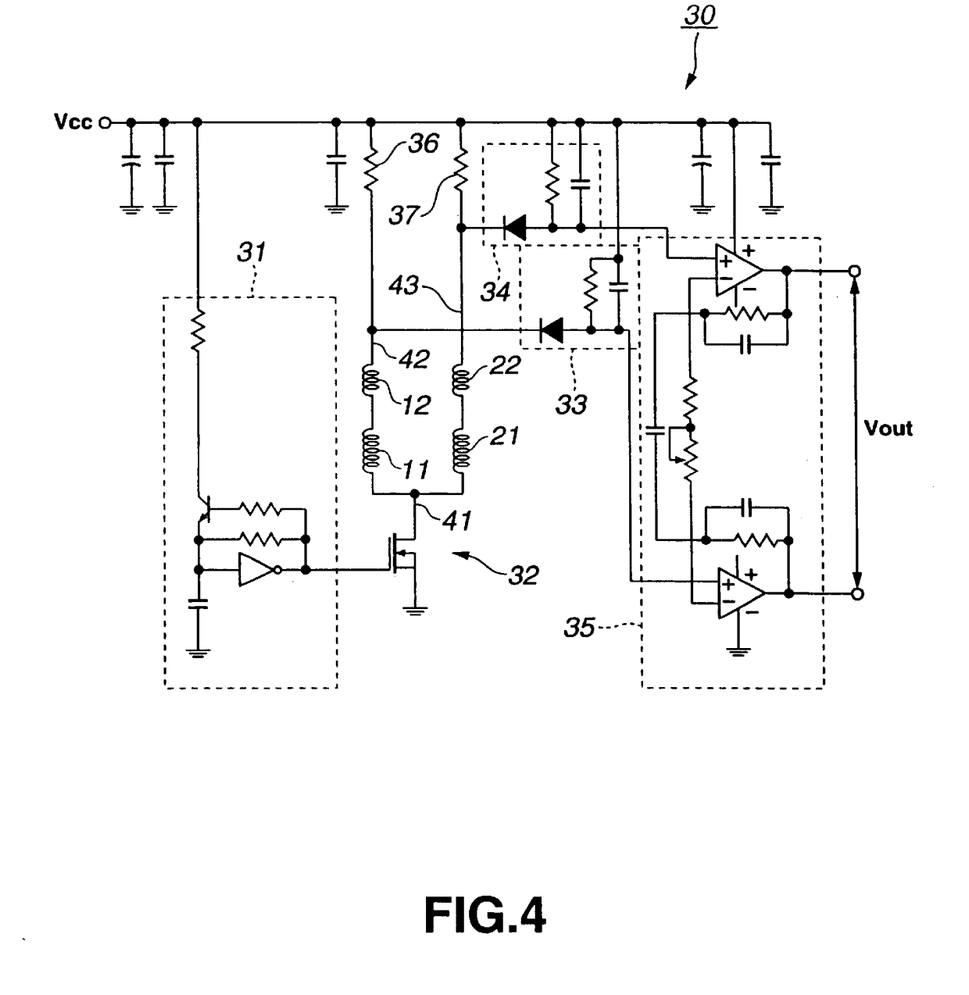
FIG. 4 is a circuit diagram of an example of the drive/detection circuit included in the position transducer shown in FIG. 3.

The position transducer 1 further includes the drive/detection circuit 30 as shown in FIG. 4 for example. The drive/detection circuit 30 is provided to detect an amount of travel and moved position of the core 5 on the basis of impedance changes of the first and second detection coils 11 and 21 as in the above. The drive/detection circuit 30 is adapted to convert the impedance changes of the first and second detection coils 11 and 21 to a voltage changes and detect a difference in output between the first and second detection coils 11 and 21. Further, the drive/detection circuit 30 is also adapted to drive the first detection coil 11 and first auxiliary coil 12 and the second detection coil 21 and second auxiliary coil 22 with a high frequency.

As shown in FIG. 4, the drive/detection circuit 30 includes an oscillation circuit 31, switching circuit 32 which switches, correspondingly to a pulse signal from the oscillation circuit 31, a driving current which excites the first detection coil 11 and first auxiliary coil 12 and the second detection coil 21 and second auxiliary coil 22, a first smoothing circuit 33 which detects and smoothes output voltages from the first and second detection coils 11 and 21, a second smoothing circuit 34 which detects and smoothes output voltages from the first and second auxiliary coils 12 and 22, and a differential amplification circuit 35 which provides a differential signal by detecting a difference between the smoothed output voltages from the first and second smoothing circuits 33 and 34.

The oscillation circuit 31 provides a high frequency pulse signal of 1 MHz in frequency and 200 ns in pulse width for example. The oscillation circuit 31 shown in FIG. 4 has a multivibrator applied therein and is characterized in that the number of parts used is smaller and it can be constructed inexpensively. Also the oscillation circuit 31 is of an RC oscillation type and it will not influence the characteristics of the coils 11, 12, 21 and 22. It should be noted that the oscillation circuit 31 may be a one using a Colpitts oscillator circuit and a quartz oscillator.

The switching circuit 32 switches, correspondingly to a high frequency pulse signal delivered from the oscillation circuit 31, a driving current flowing through the first detection coil 11 and first auxiliary coil 12 and the second detection coil 21 and second auxiliary coil 22.

Note that the coils 11, 12, 21 and 22 may be driven with a sinusoidal wave. However, the pulse signal is advantageous in that it contains a harmonic component and so can efficiently drive the coils 11, 12, 21 and 22, its duty ratio can be adjusted and so the power consumption will be smaller, and that it contains a DC component and so the changing point of the impedance to the external magnetic field can freely be shifted. Therefore, the coils 11, 12, 21 and 22 should desirably be drive with a pulsed wave.

As mentioned above, the first detection coil 11 is connected at one end thereof to one end of the first auxiliary coil 12, and at the other end to the second detection coil 21 and switching circuit 32 by a signal line 41. The first auxiliary coil 12 is connected in series to the first detection coil 11 and at the other end thereof not connected to the first detection coil 11 to a power source (Vcc) via a second signal line 42 and resistor 36.

The second detection coil 21 is connected at one end thereof to one end of the second auxiliary coil 22 and at the other end to the first detection coil 11 and switching circuit 32 by the first signal line 41. The second auxiliary coil 22 is connected in series to the second detection coil 21 and at the other end thereof not connected to the second detection coil 21 to the power source (Vcc) via a third signal line 43 and resistor 37.

The first detection coil 11 and first auxiliary coil 12 and the second detection coil 21 and second auxiliary coil 21 are bridged to each other so as to be connected in parallel to each other, and driven in phase with each other when switched by the switching circuit 32. Thus, they will be excited in phase with each other with a high frequency. That is to say, the first detection coil 11 and first auxiliary coil 12, and the second detection coil 21 and second auxiliary coil 22, are excited in phase with each other, respectively, with a high frequency while the first and second detection coils 11 and 21 are also excited in phase with each other with a high frequency.

The first smoothing circuit 33 smoothes voltages produced by the first detection coil 11 and first auxiliary coil 12 excited in phase with each other with a high frequency. Also, the second smoothing circuit 34 smoothes voltages produced by the second detection coil 21 and second auxiliary coil 22 excited in phase with each other with a high frequency.

The differential amplification circuit 35 is supplied with an output voltage from the first smoothing circuit 33, and an output voltage from the second smoothing circuit 34. The differential amplification circuit 35 amplifies a difference between the output voltage from the first smoothing circuit 33 and that from the second smoothing circuit 34.

In the drive/detection circuit 30 constructed as in the above, the switching 32 circuit is switched with a high frequency pulse signal from the oscillation circuit 31, and so the coils 11, 12, 21 and 22 are driven in phase with each other and excited in phase with each other with a high frequency. At this time, the impedance of the first detection coil 11 excited with the high frequency and that of the second detection coil 21 also excited with the high frequency will be determined by an amount of insertion of the core 5 in the coils 11 and 21 and be changed as the amount of insertion of the core 5 changes. Since the core 5 moves linearly inside the first and second detection coils 11 and 21 disposed to abut each other and along the center axis of the coils, so the amount of insertion of the core 5 in the first detection coil 11 and that of the core 5 in the second detection core 21, will change differentially with the movement of the core 5 and also the impedances of the first and second detection coils 11 and 21 will be changed differentially.

In the drive/detection circuit 30, a voltage corresponding to the impedance of the first detection coil 11 is smoothed by the first smoothing circuit 33 and supplied to the differential amplification circuit 35, while a voltage corresponding to the impedance of the second detection coil 21 is smoothed by the second smoothing circuit 34 and supplied to the differential amplification circuit 35. By determining a difference between these output voltages in the drive/detection circuit 30, it is possible to detect an amount of travel and moved position of the core 5 and the moving part 2 coupled to the core 5.

The drive/detection circuit 30 used in the position transducer 1 according to the present invention is not limited to the example shown in FIG. 4 but may be any one in which the first detection coil 11 and first auxiliary coil 12 and the second detection coil 21 and second auxiliary coil 22 can be driven with a high frequency, the changes in impedance of the first and second detection coils 11 and 21 can be converted to voltage changes and a difference in output voltage between the first and second detection coils 11 and 22 can be detected.

As in the above, since in the position transducer 1 according to the present invention, the changes in impedance of the first and second detection coils 11 and 21 corresponding to the movement of the core 5 are converted to voltage changes by the drive/detection circuit 30 and a difference between differentially changing output voltages from the first and second detection coils 11 and 12 is determined to detect an amount of travel and moved position of the core 5 and the moving part coupled to the core 5, it is possible to detect, with a high accuracy, the amount of travel and moved position of the moving part 2 while canceling the influence of the change of the output characteristic due to electric noises and changes in temperature of the detection coils 11 and 21.

In the position transducer 1 according to the present invention, the first auxiliary coil 12 driven in phase with the first detection coil 11 and also excited in phase with the latter with a high frequency is lap-wound on the first detection coil 11 at the one end portion of the latter to substantially increase the winding density at the one end portion of the first detection coil 11, while the second auxiliary coil 22 driven in phase with the second detection coil 21 and also excited in phase with the latter with a high frequency is lap-wound on the second detection coil 21 at the one end portion of the latter to substantially increase the winding density at the one end portion of the second detection coil 21. Thus, the position transducer 1 has a reduced non-linearity of the magnetic field at the one end portion of the first detection coil 11 and also at the one end portion of the second detection coil 21.

Figure 5:
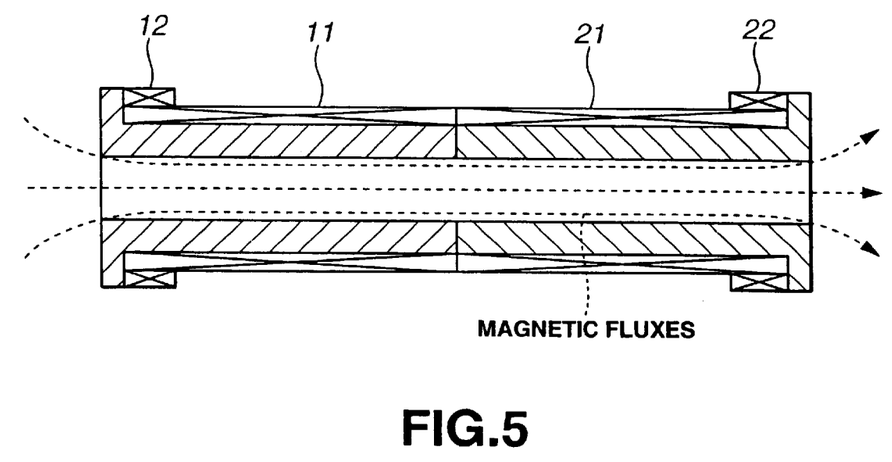
FIG. 5 shows a magnetic field developed by the detection coil of the position transducer.
Figure 6:
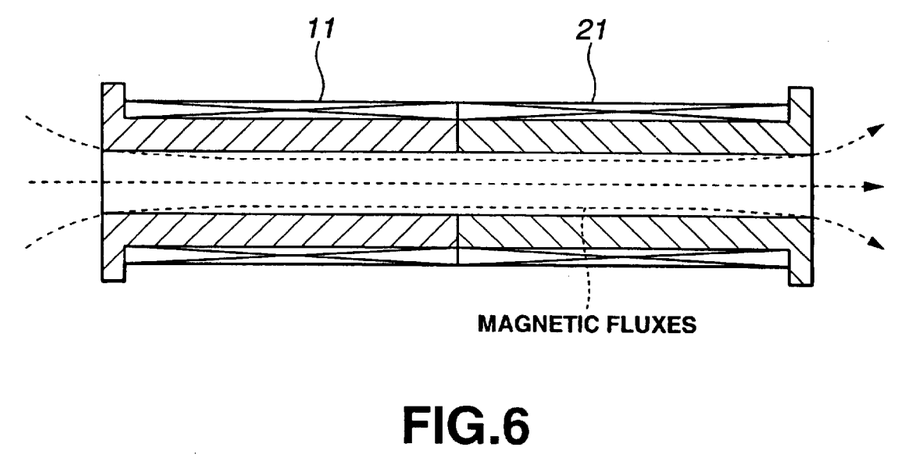
FIG. 6 shows a magnetic field developed by the detection coil of a position transducer which has no auxiliary coil.

FIG. 5 shows a magnetic field developed by the first detection coil 11 having the first auxiliary coil 12 lap-wound on the one end portion thereof and the second detection coil 21 having the second auxiliary coil 22 lap-wound on the one end portion thereof, and FIG. 6 shows, for the purpose of comparison, a magnetic field developed by the first detection coil 11 not having the first auxiliary coil 12 lap-wound on the one end portion thereof and the second detection coil 21 not having the second auxiliary coil 22 lap-wound on the one end portion thereof.

As shown in FIG. 6, the magnetic field developed by the first detection coil 11 not having the first auxiliary coil 12 lap-wound on the one end portion thereof and the second detection coil 21 not having the second auxiliary coil 22 lap-wound on the one end portion thereof extends divergently in a wide range between the one end portion of the first detection coil 11 and one end portion of the second detection coil 21. On the other hand, as shown in FIG. 5, the magnetic field developed by the first detection coil 11 having the first auxiliary coil 12 lap-wound on the one end portion thereof and the second detection coil 21 having the second auxiliary coil 22 lap-wound on the one end portion thereof extends in an ideally parallel state in a wide range between the one end portion of the first detection coil 11 and one end portion of the second detection coil 21, which means that the non-linearity of the magnetic field at one end portion of each of the detection coils 11 and 21 is reduced.

In the position transducer 1 according to the present invention, since the first auxiliary coil 12 is lap-wound on the one end portion of the first detection coil 11 and the second auxiliary coil 22 is lap-wound on the one end portion of the second detection coil 21 as in the above, the non-linearity of the magnetic field at the one end portion of the detection coils 11 and 21 can be reduced and the effective length for detection can also be assured efficiently. Therefore, the position transducer 1 can be designed compact on the whole by shortening the detection coils 11 and 21 in relation to the effective length for detection.

Figure 7:
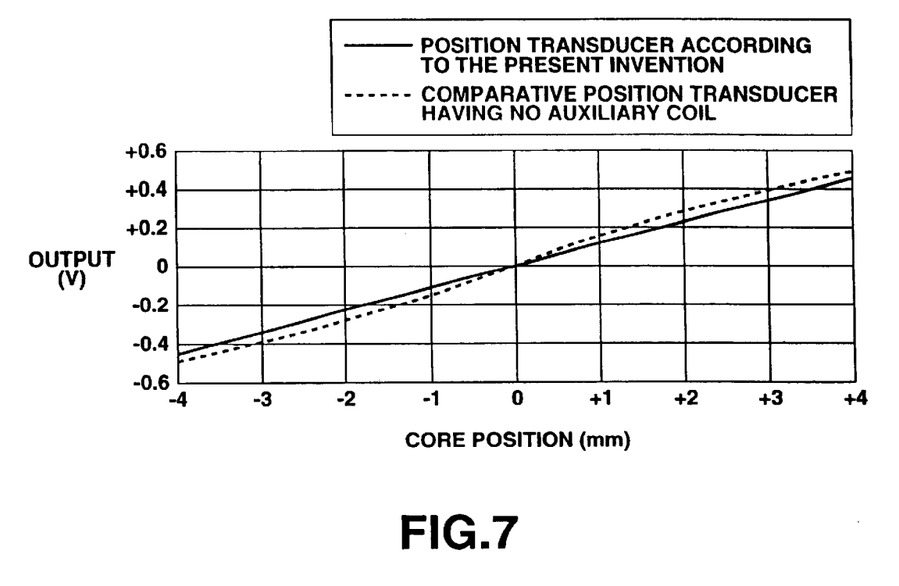
FIG. 7 shows relations between core position and output of the position transducer having the auxiliary coil and a one having no auxiliary coil.

FIG. 7 shows a relation between the position of the core 5 and output in the position transducer 1 according to the present invention and also a relation between the core position and output in a position transducer constructed similarly to the position transducer 1 according to the present invention except that the first and second auxiliary coils 12 and 22 are not provided. The latter relation is shown herein for the purpose of comparison between the present invention and prior art. Note that in the graph shown in FIG. 7, the position of the core 5 is indicated along the horizontal axis and "0" (mm) along the horizontal axis means that the core 5 is at the reference position P1 while the output from the drive/detection circuit 30 is indicated along the vertical axis.

As seen from the graph shown in FIG. 7, in the position transducer not having the first and second auxiliary coils 12 and 22, the linearity of the output from the drive/detection circuit 30 is low in a range above +3 (mm) and in a range below −3 (mm) along the horizontal axis. On the other hand, in the position transducer 1 according to the present invention, the drive/detection circuit 30 provides an output which changes linearly in a range of the effective length for detection of 8 mm because the first detection coil 11 has the first auxiliary coil 12 lap-wound on the one end portion thereof and the second detection coil 21 has the second auxiliary coil 22 lap-wound on the one end portion thereof.

Figure 8:
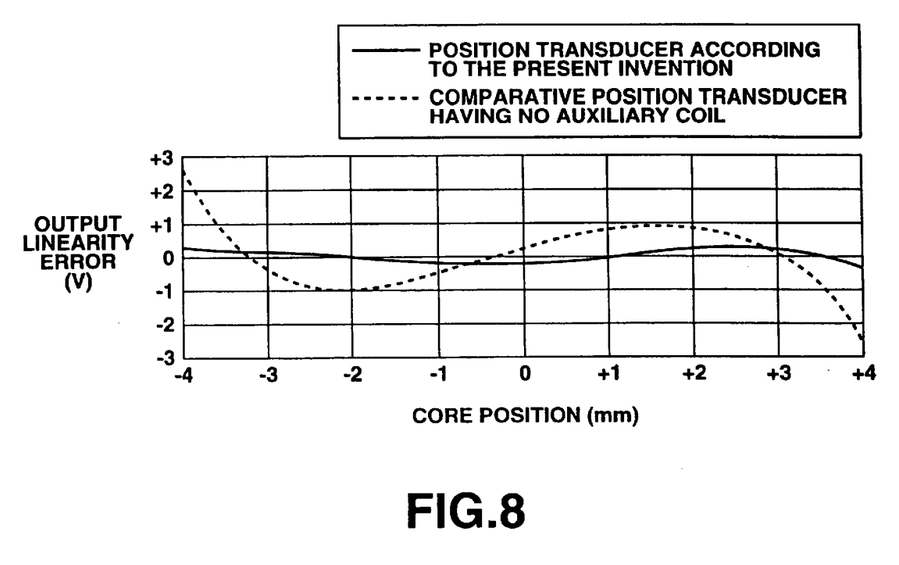
FIG. 8 shows relations between core position and output linearity error of the position transducer having the auxiliary coil and a one having no auxiliary coil.

FIG. 8 shows a relation between the core position and output linearity error in the position transducer 1 according to the present invention and also a relation between the position of the core 5 and output linearity error in a position transducer constructed similarly to the position transducer 1 according to the present invention except that the first and second auxiliary coils 12 and 22 are not provided. The latter relation is shown herein for the purpose of comparison between the present invention and prior art. Note that in the graph shown in FIG. 8, the position of the core 5 is indicated along the horizontal axis and "0" (mm) along the horizontal axis means that the core 5 is at the reference position P1 while the linearity error of the output from the drive/detection circuit 30 is indicated along the vertical axis. The output linearity error is determined by calculating, using the least square method, an approximate line from a distribution of the outputs from the drive/detection circuit 30 with respect to the positions of the core 5 and by taking as an error (%) a difference of the actual output distribution from the approximate line.

As seen from FIG. 8, in the position transducer without the first and second auxiliary coils 12 and 22, the output linearity error is large, and more particularly, the output linearity error in the negative going direction is over 1% in a range above +3.5 (mm) along the horizontal axis and also the output linearity error in the positive going direction is over 1% in a range below −3.5 (mm) along the horizontal axis. On the other hand, in the position transducer 1 according to the present invention, the output linearity error is suppressed to less than +0.3% in a range of the effective length for detection of 8 mm because the first detection coil 11 has the first auxiliary coil 12 lap-wound on the one end portion thereof and the second detection coil 21 has the second auxiliary coil 22 lap-wound on the one end portion thereof.

In the position transducer 1 according to the present invention, since the first detection coil 11 has the first auxiliary coil 12 lap-wound on the one end portion thereof while the second detection coil 21 has the second auxiliary coil 22 lap-wound on the one end portion thereof as described in the above, the linearity error in a range of the effective length for detection of 8 mm and thus an output having an extremely high linearity can be provided. In other words, in the position transducer 1 according to the present invention, since the first and second auxiliary coils 12 and 22 are provided, an output whose linearity is very high can be provided even in a range in which no good output linearity can be provided and thus the amount of travel of the core 5 cannot be detected appropriately in the position transducer not having the first and second auxiliary coils 12 and 22 are provided therein. Therefore, the position transducer 1 according to the present invention can be designed compact on the whole while assuring the effective length for detection efficiently.

With the position transducer 1 according to the present invention, it is possible to reduce the non-linearity of the magnetic field at the one end portion of each of the first and second detection coils 11 and 12 and thus provide an output having a high linearity by lap-winding of the first auxiliary coil 12 on the one end portion of the first detection coil 11 and the second auxiliary coil 22 on the one end portion of the second detection coil 21. However, if the first and second auxiliary coils 21 and 22 are not wound in appropriate positions on the first and second detection coils 11 and 21, respectively, the non-linearity of the magnetic field will rather be increased.

More specifically, in the aforementioned comparative example, when a Cu wire of about 70 $\mu$m in diameter as the first auxiliary coil 12 is wound closely in an area of about 2.5 mm from the flange 10a of the first detection coil 11 while a Cu wire of about 70 µm in diameter as the second auxiliary coil 22 is wound closely in an area of about 2.5 mm from the flange 20a of the first detection coil 21, the output at the one end of the first detection coil 11 and that at the one end of the second detection coil 21 will be too large and thus the non-linearity of the magnetic fields developed by the detection coils will be increased.

On the assumption that an output linearity error allowed in the position transducer 1 is 1% or less in the positive and negative going directions, the output linearity error in the position transducer not having the first and second auxiliary coils 12 and 22 will exceed the allowable range with the core 5 being within a range above +3.5 (mm) and a range below −3.5 (mm) along the horizontal axis as shown in FIG. 8. Therefore, it is expectable that the non-linearity of the magnetic field can be reduced by winding the first and second auxiliary coils 12 and 22 in the area of 1.5 mm from the one end of the first detection coil 11 and in the area of 1.5 mm from the one end of the second detection coil 21, respectively, corresponding to the range above +3.5 (mm) and range below −3.5 (mm) of the position of the core 5 along the horizontal axis in FIG. 8 to increase the output from the drive/detection circuit 30.

By winding 20 turns of a Cu wire of about 70 µm as the first auxiliary coil 12 in an area of 1.5 mm from the one end portion of the first detection coil 11 and 20 turns of a Cu wire of about 70 µm as the second auxiliary coil 22 in an area of 1.5 mm from the one end portion of the second detection coil 21 actually in the aforementioned comparative example, the non-linearity of the magnetic fields at the one end of the first detection coil 11 and at the one end of the second detection coil 21 could be reduced and the linearity error in a range of the effective length for detection of 8 mm could be extremely low and an output whose linearity was very high could be provided as shown in FIGS. 7 and 8.

In the foregoing, the present invention has been described concerning the position transducer 1 according to the first embodiment, in which the first detection coil 11 has the first auxiliary coil 12 lap-wound on the one end portion thereof and the second detection coil 21 has the second auxiliary coil 22 lap-wound on the one end portion thereof. It should be noted however that even with an auxiliary coil lap-wound only on either the one end portion of the first detection coil 11 or on the one end portion of the second detection coil 21, the non-linearity of the magnetic field is reduced in the vicinity of the end portion of the detection coil on which the auxiliary coil is wound, which is effective for assuring the effective length for detection efficiently. However, by winding the auxiliary coil on the one end portion of each of the first and second detection coils 11 and 21, the magnetic field non-linearity at the one end portion of each of the detection coils 11 and 21 can be reduced and thus the effective length for detection can be assured efficiently.

Also, the present invention has been described in the foregoing concerning the position transducer 1 adapted to detect an amount of travel and moved position of the moving part 2 which is a linearly moving part of a machine tool, industrial robot or the like when the core 5 coupled with the spindle 6 to the moving part 2 is moved linearly inside the core insertion hole. However, the present invention is not limited to this embodiment but can be designed such that the core 5 is stationary while there are coupled to the moving part 2 the first coil bobbin 10 having the first detection coil 11 wound thereon and the second coil bobbin 20 having the second detection coil 21 wounded thereon and the coil bobbins 10 and 20 are moved over the core 5 when the moving part 2 moves.

Second Embodiment

Next, a second embodiment of the position transducer according to the present invention will be described below.

As in the foregoing, the position transducer 1 according to the first embodiment includes two detection coils 11 and 21. However, the second embodiment of the position transducer includes only one detection coil substantially as long as the first and second detection coils in the first embodiment. In the position transducer according to this second embodiment, the single detection coil is used to provide a nearly same effective length for detection as in the position transducer 1 according to the first embodiment, and more particularly an effective length for detection of about 7 mm for example.

Figure 9:
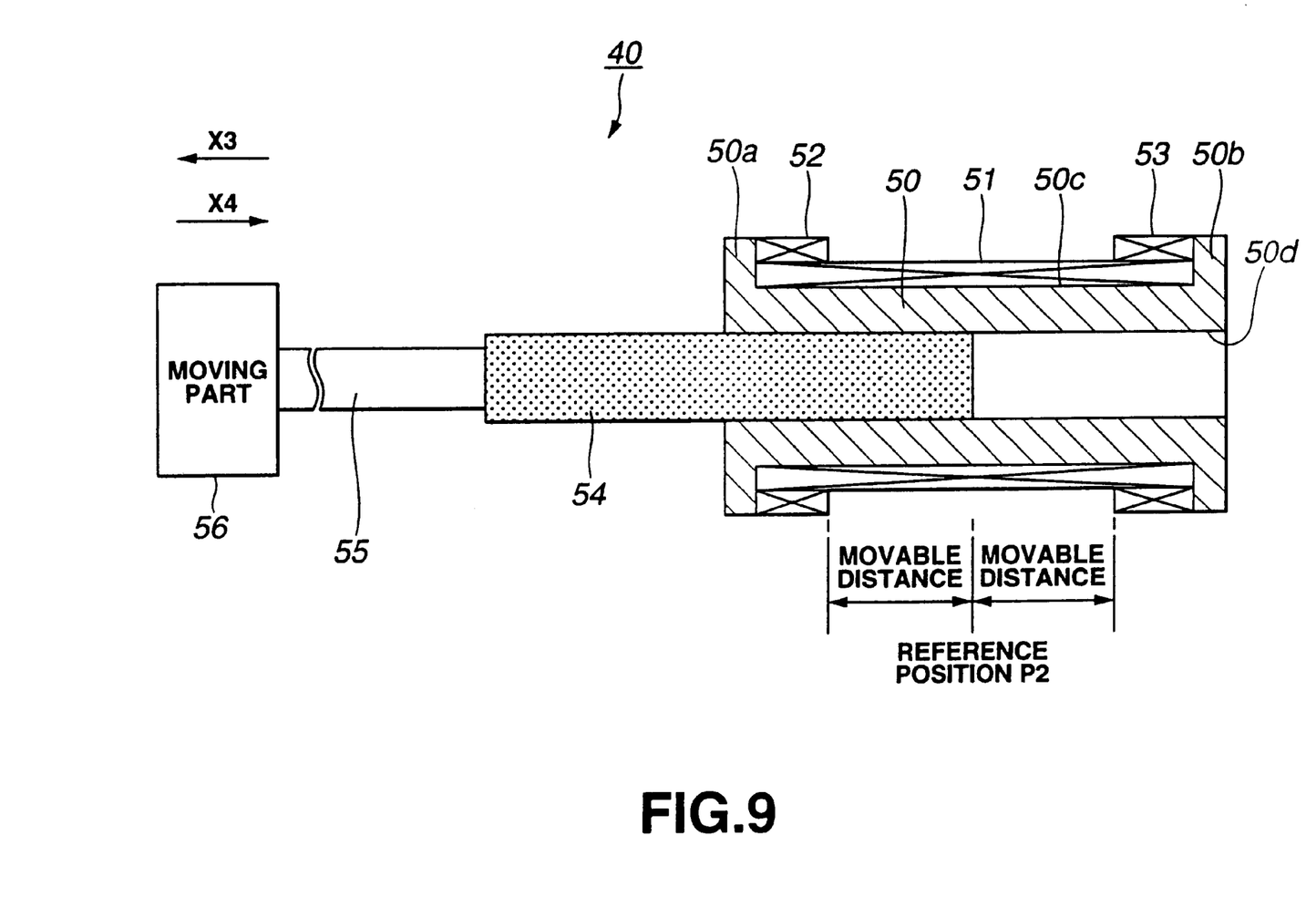
FIG. 9 is a sectional view of another embodiment of the position transducer according to the present invention.

Referring now to FIG. 9, there is illustrated in the form of a sectional view the position transducer according to the second embodiment of the present invention. The position transducer is generally indicated with a reference 40. The position transducer 40 includes a coil bobbin 50 and a detection coil 51 wound on the coil bobbin 50.

The coil bobbin 50 is formed cylindrical and has flanges 50a and 50b formed at opposite ends thereof, respectively. The coil bobbin 50 has defined on the outer surface thereof a winding area 50c extending from the inner surface of the flange 50a provided at one end thereof to that of the flange 50b provided at the other end. The diameter of the bobbin 50 as measured at the winding area 50c is about 4 mm for example, and the winding area 50c is about 10 mm long for example. The coil bobbin 50 has the detection coil 51 wound in the winding area 50c.

The detection coil 51 is formed from by winding a Cu wire of about 70 µm for example in diameter to form a single layer over the winding area 50c of the coil bobbin 50. More specifically, the detection coil 51 is formed from 140 turns of the Cu wire made over the winding area 50c of the coil bobbin 50.

Further, a first auxiliary coil 52 is lap-wound on the detection coil 51 over an area of about 1.5 mm, for example, from the flange 50a on one end portion of the detection coil 51, namely, on a portion of the detection coil 51 wound adjacently to the flange 50a. The first auxiliary coil 52 is intended to increase the winding density of the detection coil 51 at the one end portion of the latter and compensate the output. The first auxiliary coil 51 is formed, on the one end portion of the detection coil 51, from 20 turns, for example, of the similar Cu wire to that of the detection coil 51. The first auxiliary coil 52 is adapted to be driven in phase with the detection coil 51 so that when they are drive, the magnetic field developed by the first auxiliary coil 52 will take the same direction as that developed by the detection coil 51.

Also, a second auxiliary coil 53 is lap-wound on a portion, near the flange 50a of the detection coil 51, for example, over an area of about 1.5 mm, for example, from the flange 50b on the other end portion of the detection coil 51, namely, on a portion of the detection coil 51 wound adjacently to the flange 50b. The second auxiliary coil 53 is intended to increase the winding density of the detection coil 51 at the one end portion of the latter and compensate the output. Similar to the first auxiliary coil 52, the second auxiliary coil 53 is formed, on the other end portion of the detection coil 51, from 20 turns, for example, of the similar Cu wire to that of the detection coil 51. The second auxiliary coil 53 is adapted to be driven in phase with the detection coil 51 so that when they are drive, the magnetic field developed by the second auxiliary coil 53 will take the same direction as that developed by the detection coil 51.

The first and second auxiliary coils 53 and 53 are electrically connected at one end thereof in series to each other. The other end of the first auxiliary coil 51, not connected to the second auxiliary coil 53, is connected to one end of the detection coil 51, while the common connection of the first and second auxiliary coils 52 and 53 is connected, by a first signal line (not shown), to a drive/detection circuit constructed similarly to the aforementioned drive/detection circuit 30 provided in the position transducer 1 according to the first embodiment of the present invention. The other end of the detection coil 51, not connected to the first auxiliary coil 52, is connected to the drive/detection circuit by a second signal line (not shown), and the other end of the second auxiliary coil 53, not connected to the first auxiliary coil 52, is connected to the drive/detection circuit by a third signal line (not shown). The detection coil 51, first and second auxiliary coils 52 and 53 are driven by the drive/detection circuit with a high frequency.

Note that the drive/detection circuit of the position transducer 40 is constructed similarly to the drive/detection circuit 30 provided in the position transducer 1 according to the first embodiment except that the detection coil 51 is connected to the portion of the drive/detection circuit 30 to which the first and second auxiliary coils 11 and 12 are connected and that the first and second auxiliary coils 52 and 53 are connected to the portion to which the second detection coil 21 and second auxiliary coil 22 are connected. Therefore, the drive/detection circuit in the second embodiment will not be illustrated and further described.

The coil bobbin 50 has formed through it a center hole 50d extending in the direction of the center axis thereof and having a diameter of about 2.2 mm for example. In the position transducer 40, a round bar-shaped magnetic core 54 is inserted in the center hole 50d in the coil bobbin 50 and linearly movable inside the center hole 50d in the coil bobbin 50.

Similar to the core 5 provided in the position transducer 1 according to the first embodiment of the present invention, the core 54 is formed from a round bar of a magnetic material such SK material, having a diameter of about 2 mm and length of about 10 mm, and coupled at one end hereof with a spindle 55 to a moving part 56 which is a linearly moving part of a machine tool, industrial robot or the like. The core 54 is inserted in the center hole 50d in the coil bobbin 50. The end portion of the core 54 opposite to the end thereof coupled to the moving part 56 is linearly moved inside the center hole 50d in the coil bobbin 50 along the center axis of the detection coil 51 in relation to the center of the center hole 50d in the col bobbin 50, that is, a reference position P2 at the middle of the length of the detection coil 51 wound on the coil bobbin 50 as the moving part 56 moves linearly in a range of 7 mm at the maximum.

In the above position transducer 40, as the moving part 56 being a linearly moving part of the machine tool, industrial robot or the like moves in the directions of arrows X3 and X4, the core 54 coupled to the moving part 56 will be moved inside the center hole 50d in the coil bobbin 50 for the amount of travel of the moving part 56. When the core 54 is moved linearly inside the center hole 50d in the coil bobbin 50, the amount of insertion of the core 54 relative to the detection coil 51 will change, so that the impedance of the detection coil 51 will be changed correspondingly.

More specifically, the impedance of the detection coil 51 is determined by the amount of insertion of the core 54 in the detection coil 51 and will be changed linearly in proportion to a change in amount of insertion of the core 54. For example, when the core 54 is moved in the direction of arrow X3 from the reference position P2 and thus the amount of insertion of the core 54 in the detection coil 51 is decreased, the impedance of the detection coil 51 will be decreased for the decrease in amount of insertion of the core 54. On the other hand, when the core 54 is moved in the direction of arrow X4 from the reference position P2 and thus the amount of insertion of the core 54 in the detection coil 54 is increased, the impedance of the detection coil 51 will be increased for the increase in amount of insertion of the core 54.

Therefore, the position transducer 40 can detect, with a high accuracy, an amount of travel and moved position of the core 54, that is, the moving part 56 coupled to the core 54 by converting the change in impedance of the detection coil 51 to a voltage change and detecting this voltage change by the drive/detection circuit.

Also, in this position transducer 40, even when the core 54 is moved to the maximum possible extent in the direction of arrow X3, the core 54 will always stay completely inside the first auxiliary coil 52. On the contrary, even if the core 54 is moved to the maximum possible extent in the direction of arrow X4, the core 54 will not go into the second auxiliary coil 53. Thus, the impedance of the first and second auxiliary coils 52 and 53 will be little changed irrespectively of the movement of the core 54.

Therefore, by designing the position transducer 40 such that the impedance of the detection coil 51 when the core 54 is at the reference position P2 is equal to a total impedance of the first and second auxiliary coils 52 and 53, it is possible to detect, with an extremely high accuracy, an amount of travel and moved position of the moving part 56 while canceling the influence of electric noises and a change, caused by a temperature change, of the output characteristic of the detection coil 51, first and second auxiliary coils 52 and 53 by determining, with the drive/detection circuit, a difference in output between the detection coil 51 and the first and second auxiliary coils 52 and 53.

Also, in the position transducer 40, since the first auxiliary coil 52 driven in phase with the detection coil 51 and excited in phase with the detection coil 51 with a high frequency is lap-wound on the one end portion of the detection coil 51 and the second auxiliary coil 53 driven in phase with the detection coil 51 and excited in phase with the detection coil with a high frequency is lap-wound on the other end portion of the detection coil 51, to thereby substantially increase the winding density at the opposite ends of the detection coil 51, so the non-linearity of the magnetic field at the opposite ends of the detection coil 51 can be reduced. Therefore, with this position transducer 40, the effective length for detection can be assured efficiently, and the length of the detection coil in relation to the effective length for detection is relatively decreased to design the position transducer compact on the whole and permit a high accuracy of the position detection.

In the foregoing, the present invention has been described concerning the position transducer 40 according to the second embodiment, in which the detection coil 51 has the first and second auxiliary coil 52 and 53 lap-wound on the opposite end portions thereof. It should be noted however that even with an auxiliary coil lap-wound only on either the one end portion of the detection coil 51, the non-linearity of the magnetic field is reduced in the vicinity of the end portion of the detection coil 51 on which the auxiliary coil is wound, which is effective for assuring the effective length for detection efficiently. Also in this case, by designing the position transducer 40 such that the impedance of the detection coil 51 when the core 54 is at the reference position P2 is equal to the impedance of the auxiliary coil, it is possible to detect, with an extremely high accuracy, an amount of travel and moved position of the moving part 56 while canceling the influence of electric noises and a change, caused by a temperature change, of the output characteristic of the detection coil 51 and auxiliary coil by determining, with the drive/detection circuit, a difference in output between the detection coil 51 and auxiliary coil. However, since the non-linearity of the magnetic fields at both the ends of the detection coil is reduced with auxiliary coils lap-wound on the opposite end portions of the detection coil 51, so the effective length for detection can be assured with a higher efficiency.

Also, the present invention has been described in the foregoing concerning the position transducer 40 adapted to detect an amount of travel and moved position of the moving part 56 which is a linearly moving part of a machine tool, industrial robot or the like when the core 54 coupled with the spindle 55 to the moving part 56 is moved linearly inside the center hole 50d in the coil bobbin 50. However, the present invention is not limited to this embodiment but can be designed such that the core 54 is stationary while there are coupled to the moving part 56 the coil bobbin 50 having the first detection coil 51 wound thereon and the coil bobbin 50 is moved over the core 54 when the moving part 56 moves.

What is claimed is:

1. A position transducer comprising:

a detection coil excited with a high frequency;

a magnetic core inserted in the detection coil such that the magnetic core may be moved with respect to the detection coil along a center axis of the detection coil;

an auxiliary coil lap-wound on an end of the detection coil and driven in phase with the detection coil; and means for detecting a relative position of the magnetic core with respect to the detection coil based upon an impedance change of the detection coil, wherein when the magnetic core is at a reference position inside the detection coil, the impedance of the auxiliary coil is equal to the impedance of the detection coil and the means for detecting a relative position determines a difference in output between the detection coil and the auxiliary coil to detect a position of the core relative to the detection coil.

2. The position transducer as set forth in claim 1, wherein the detection coil includes first and second detection coils disposed concentrically with and adjacent to each other, and the position detecting means detects a relative position of the magnetic core with respect to the first and second detection coils by determining a difference in output between the first and second detection coils.

3. The position transducer as set forth in claim 1, wherein the auxiliary coil includes a first auxiliary coil provided at an end of the detection coil and a second auxiliary coil connected in series to the first auxiliary coil and provided at another end of the detection coil, and when the core is at a reference position inside the detection coil, the total impedance of the first and second auxiliary coils is equal to the impedance of the detection coil and the position detecting means determines a difference in output between the detection coil and the first and second auxiliary coils to detect a relative position of the magnetic core to the detection coil.

* * * * *